(12) United States Patent
Pearce

(10) Patent No.: US 9,588,246 B2
(45) Date of Patent: Mar. 7, 2017

(54) DATA COLLECTION SYSTEM, MARINE SEISMIC SURVEY SYSTEM AND METHOD OF ESTIMATING A CORRECTED SOUND SPEED

(75) Inventor: Christopher D. Pearce, Hook (GB)

(73) Assignee: Sonardyne International Limited, Yately (GB)

( * ) Notice: Subject to any disclaimer, the term of this patent is extended or adjusted under 35 U.S.C. 154(b) by 975 days.

(21) Appl. No.: 13/575,269

(22) PCT Filed: Jan. 25, 2011

(86) PCT No.: PCT/GB2011/050118
§ 371 (c)(1),
(2), (4) Date: Sep. 12, 2012

(87) PCT Pub. No.: WO2011/089449
PCT Pub. Date: Jul. 28, 2011

(65) Prior Publication Data
US 2012/0327741 A1 Dec. 27, 2012

(30) Foreign Application Priority Data
Jan. 25, 2010 (GB) .................................. 1001157.5

(51) Int. Cl.
*G01V 1/38* (2006.01)
(52) U.S. Cl.
CPC .................................. *G01V 1/3835* (2013.01)
(58) Field of Classification Search
CPC ...................................................... G01V 1/3835

USPC ............................................................. 367/19
See application file for complete search history.

(56) References Cited

U.S. PATENT DOCUMENTS

| | | | |
|---|---|---|---|
| 3,860,900 A | 1/1975 | Scudder | |
| 4,635,236 A | 1/1987 | Roberts | |
| 4,992,990 A * | 2/1991 | Langeland et al. | 367/19 |
| 5,691,957 A * | 11/1997 | Spiesberger | 367/3 |
| 2002/0064092 A1 | 5/2002 | Nishimura | |
| 2006/0256651 A1* | 11/2006 | Sanders et al. | 367/15 |
| 2008/0048881 A1 | 2/2008 | Safinya | |

OTHER PUBLICATIONS

International Search Report and Written Opinion (PCT/GB2011/050118), dated Mar. 15, 2012.

* cited by examiner

*Primary Examiner* — Daniel L Murphy
(74) *Attorney, Agent, or Firm* — Bracewell LLP; Keith R. Derrington

(57) ABSTRACT

A data collection system 100 for estimating a corrected sound speed between a first point and a second point comprises a subsea acoustic transponder beacon (106) disposed at a fixed position relative to a seabed (108), and an acoustic transceiver (214) immersed below a sea surface (104) and above the acoustic beacon (106). A processing resource (200) is also operably coupled to the acoustic transponder (214), the acoustic transceiver (214) being arranged to traverse a path above the acoustic beacon (106) and communicate with the acoustic beacon (106). The processing resource (200) is also arranged to collect time-of-flight data associated with the communication between the acoustic transceiver (214) and the acoustic beacon (106).

22 Claims, 6 Drawing Sheets

DATA COLLECTION SYSTEM, MARINE SEISMIC SURVEY SYSTEM AND METHOD OF ESTIMATING A CORRECTED SOUND SPEED

FIELD OF THE INVENTION

The present invention relates to a data collection system of the type that, for example, measures an acoustic signal in order to calculate a time-of-flight of the acoustic signal. The present invention also relates to a marine seismic survey system of the type that, for example, employs a reflection seismology technique. The present invention further relates to a method of estimating a corrected sound speed, the method being of the type that, for example, uses an acoustic signal in order to calculate a time-of-flight of the acoustic signal.

BACKGROUND OF THE INVENTION

In the field of marine seismic survey operations, for example for oil and gas exploration at sea, it is known to employ a so-called reflection seismology method in order to determine, at least approximately, properties of the Earth's subsurface from reflected seismic waves. In this respect, the earth is a layered structure, each layer having different acoustic propagation properties. In a marine environment, a seismic vessel tows a sound source and one or more streamers having hydrophones disposed therein. Periodically, the source produces a high energy impulse-like signal, some of which propagates down through the sea water column, penetrates the seabed and continues propagating through the Earth's subsurface layered structure. Some of the energy of the signal is reflected at each boundary or interface between layers, known as reflection events, and travels back up through the Earth and seawater to the hydrophones. The signals arriving at each hydrophone are a convolution of the transmitted signal and the reflection events. The hydrophones translate received acoustic energy of the transmitted signal and the reflection events into electrical signal data. On the seismic vessel, the signal data generated by each hydrophone is recorded as a time series and, together with geometric information, is processed using a de-convolution filter to image the structure of the part of the Earth being surveyed.

Signals that reflect off the seabed and at interfaces of the subsurface layered structure are known as "primary reflections". Data generated by the hydrophones in respect of these primary reflections enable the properties of the Earth's subsurface to be estimated. However, a significant amount of the sound energy emitted by the sound source travels within a space between the sea surface and the seabed and successively reflects off the sea surface and the other interfaces. For a given hydrophone, these signals, known as sea-surface multiples, arrive at the hydrophone by a number of different paths, sometimes referred to as "modes". The direct, or incident, wave signal from the source to the hydrophone and the sea-surface multiples are added to the primary reflection signals. The direct wave signal from the source to the hydrophone and the sea-surface multiples therefore interfere with the wanted primary reflection signals and degrade an image of the Earth's subsurface layered structure. It is therefore necessary to model the interfering signal at each hydrophone so that the interfering signal can be subtracted from the wanted primary reflection signals and thereby enhance the image of the Earth's subsurface layered structure. To this end, a position estimate of the sound source at an instant of transmission of the acoustic signal and a position estimate of each hydrophone at each sampling instant are available from location determination and computing hardware aboard the seismic vessel in order to facilitate estimation, for each sea-surface multiple, of the time of flight of an acoustic signal from the sound source to each hydrophone.

"Marine seismic wavefield measurement to remove sea-surface multiples" (A. M. Ziolkowski, et al., Geophysical Prospecting, Volume 47, Number 6, November 1999) describes a typical method for removing sea-surface multiples and the incident wave. The method uses an array of hydrophones to make source measurements of a wavefield made during data acquisition. The incident field inferred by these measurements is removed leaving a scattered field response. Using a zero pressure condition at the sea surface, the effect of the sea surface multiples is removed. Good estimates of the corrected sound speed in water are however necessary for the method to be effective.

Ray tracing is a well known method to generate a synthetic multiple wave and subtract it from an actual wave to obtain supposedly multiple-free data. A first stage of this technique is to derive a sound speed profile by measuring the sound speed at a number of sample points through the water column to enable calculation of the sound speed as a function of depth. Then, using the laws of refraction and reflection, the paths or modes that a signal can take from the sound source to the hydrophone are traced and the travel time and distance traveled estimated for each mode. The data may be processed so that a corrected sound speed can be estimated as a function of horizontal distance between the sound source and hydrophone, the depth of the sound source and the depth of the hydrophone. The corrected sound speed may be used to convert a travel time measurement into a true distance.

In order to calculate the sound speed profile, it is known to measure the sound speed at each sample point using a direct reading instrument employing a so-called "sing-around" method. This type of instrument uses an ultra high frequency projector and a reflector at either end of a very stable baseline. The time of flight along repeated traverses of the baseline is measured and therefore, as the baseline length is known, the sound speed can be estimated. An example of the direct reading instrument using this principle is the MIDAS Sound Velocity Profiler available from Valeport Limited, UK. Alternatively, the sound speed can be estimated using an instrument that measures parameters such as conductivity, temperature and pressure depth and uses an empirically derived algorithm to calculate the sound speed at each sample point. An example of such an instrument using this principle is the MIDAS CTD Profiler available from Valeport Limited, UK.

However, both of these two techniques have significant error budgets associated with calibration, parameter estimation and/or the algorithm employed. For example, the sound speed profile within a given volume of seawater varies significantly throughout the day and from day-to-day. Furthermore, from a practical perspective, measurement of the sound speed profile is difficult, especially in deep water from a moving vessel. Repeating such measurements sufficiently regularly is therefore an onerous and costly exercise.

As an alternative method, it is known to adapt an Inverted Echo Sounder (IES) principle used by ocean physicists to investigate the stratification of the ocean. The IES is deployed on the seabed and projects an impulse-like acoustic signal in a narrow beam to the sea surface. The IES detects the reflected acoustic signal and records a time of flight associated therewith. Using a pressure sensor or by a number of other means, the depth of the water through which the acoustic signal propagated can be estimated. However, there are a number of practical problems associated with this method, for example loss due to the reflectivity of the sea surface, the "roughness" of the sea surface and the resulting incoherence of the reflected acoustic signal, aeration at the sea surface in rough weather and a two-way spherical spreading loss. These factors limit the ability to measure the water depth, the precision of measurement and the battery life of the instrument incorporating the IES. Also, implementation of a so-called "bi-static measurement path" by employing two IESs spaced apart on the seabed is difficult due to the need to synchronise each instrument incorporating a respective IES. In addition, the respective beams of the IESs have to be non-directive rather than directive beams, which is problematic. Problems are also associated with steering a beam in the correct direction at each instrument and a reflection loss at the surface, which increases as the angle of incidence at the sea surface reduces. Also, the data collected can be substantial, and for practical and commercial reason has to be recovered from a moving vessel, which constitutes a further complication. Furthermore, by way of contrast with a marine seismic survey vessel, using state of the art equipment, the Marine Seismic survey vessel can continue to operate and acquire useful data in a sea state as high as sea state 6. However, the IES method is unlikely to deliver useful data in this sea state.

BRIEF SUMMARY OF THE INVENTION

According to a first aspect of the present invention, there is provided a data collection system for estimating a corrected sound speed between a first point and a second point, the system comprising: a position determining apparatus arranged to generate, when in use, position data; a subsea acoustic transponder beacon disposed at a fixed position relative to a seabed; an acoustic transceiver immersed below a sea surface and above the acoustic beacon; and a processing resource operably coupled to the acoustic transceiver; wherein the acoustic transceiver is arranged to traverse a path above the acoustic beacon and communicate with the acoustic beacon; and the processing resource is arranged to store time data and position data associated with the communication between the acoustic transceiver and the acoustic beacon.

The communication between the acoustic transceiver and the acoustic beacon may have a two-way travel time associated therewith.

The communication between the acoustic transceiver and the acoustic beacon may comprise: the acoustic transceiver being arranged to transmit an acoustic interrogation signal to the acoustic beacon; and the acoustic beacon may be arranged to receive the interrogation signal and to transmit an acoustic response signal in response thereto.

The processing resource may be arranged to calculate a time-of-flight associated with the communication between the acoustic transceiver and the acoustic beacon.

The acoustic transceiver may be operably coupled to a seafaring vessel.

The path traversed by the acoustic transceiver, when in use, may be a plurality of substantially equal-spaced run lines arranged to form an array of run lines.

The system may further comprise a plurality of acoustic transponder beacons comprising the acoustic beacon; wherein the plurality of acoustic beacons may be disposed at a plurality of respective fixed positions relative to the seabed.

The plurality of acoustic beacons may be beneath the plurality of run lines.

The acoustic transceiver may be arranged to transmit the interrogation signal to the acoustic beacon at predetermined intervals during the traversal of the path.

The processing resource may be arranged to record a first time associated with transmittal of the interrogation signal and a second time associated with receipt of the response signal.

The processing resource may be arranged to estimate a position of the acoustic beacon using a trilateration technique.

The position of the acoustic beacon may be estimated with respect to a reference spheroid.

The processing resource may be arranged to use a ray tracing module in order to estimate the corrected sound speed.

The ray tracing module may be arranged to calculate corrected sound speeds and to fit a function to the calculated corrected sound speeds; the function may be of horizontal distance from a position of the acoustic beacon. The function may be a linear function.

Alternatively, the function may be non-linear. The non-linear function may be a second order function or a third order function or a fourth order function.

The processing resource may be arranged to calculate corrected sound speed using a time-of-flight associated with a path that may be substantially equal to or less than about 45 degrees from substantially vertical.

The acoustic transceiver may be immersed at a depth corresponding to an immersion depth of a streamer used for seismic surveying.

The system may further comprise: a streamer; the streamer may comprise the acoustic transceiver.

The streamer may comprise a plurality of acoustic transceivers including the acoustic transceiver.

The processing resource may be arranged to store time data and position data associated with a reflection of an acoustic signal by a sea surface above the streamer.

The time data and position data associated with the acoustic signal may be in respect of a propagation path from the streamer; the propagation path may comprise a reflection by the sea surface and arriving at a point along the streamer.

The reflection of the acoustic signal by the sea surface may be to a plurality of points along the streamer; the reflected acoustic signal may be received by a number of the plurality of acoustic transceivers.

The processing resource may be arranged to calculate another time-of-flight associated with the acoustic signal reflected by the sea surface.

The acoustic transceivers may be spaced at predetermined intervals along the streamer.

The predetermined intervals may be sufficiently small to minimise signal coherence at a predetermined signal frequency employed.

A frequency of an acoustic signal transmitted by one of the plurality of acoustic transceivers may have a wide bandwidth.

The frequency of the acoustic signal may be between about 4 kHz and about 20 kHz.

The plurality of acoustic transceivers may comprise: a first transceiver and a second transceiver, the first transceiver being arranged to transmit an acoustic signal for receipt by the second transceiver and the second transceiver being arranged to transmit another acoustic signal for receipt by the first transceiver, thereby enabling time-of-flight measurements to be made in respect of a forward direction of travel and a reverse direction of travel of the streamer.

The plurality of acoustic transceivers may be disposed about a mid-point of the streamer.

The frequency of the interrogation signal may be between about 1 kHz and about 100 kHz The frequency of the interrogation signal may be about 20 kHz.

According to a second aspect of the invention, there is provided a marine seismic survey system comprising: a sound source; and a data collection system as set forth above in relation to the first aspect of the invention when the streamer is employed.

According to a third aspect of the invention, there is provided a method of estimating a corrected sound speed between a first point and a second point, the method comprising: disposing a subsea acoustic transponder beacon at a fixed position relative to a seabed; immersing an acoustic transceiver below a sea surface and above the acoustic beacon; the acoustic transceiver traversing a path above the acoustic beacon and communicating with the acoustic beacon; generating position data; and storing time data and position data associated with the communication between the acoustic transceiver and the acoustic beacon.

According to a fourth aspect of the invention, there is provided a computer program element comprising computer program code means to make a computer execute the method as set forth above in relation to the third aspect of the invention.

The computer program element may be embodied on a computer readable medium.

It is thus possible to provide a system and method that collects a highly redundant dataset in respect of diverse geometry, thereby enabling precise position determination of the acoustic beacon despite a relatively poor and/or outdated estimate of sound speed in a water column. It is also possible to generate an accurate estimate model of corrected sound speed in respect of the water column as a function of horizontal distance between the acoustic beacon and the acoustic transceiver. Furthermore, the model is up-to-date and follows semi-diurnal, diurnal and seasonal variations of a sound speed profile in the water column. By taking measurements in both forward and reverse directions relative to the direction of motion of a streamer, it is also possible to mitigate the effects of motion of the streamer through the water.

BRIEF DESCRIPTION OF THE DRAWING

At least one embodiment of the invention will now be described, by way of example only, with reference to the accompanying drawings, in which.

DETAILED DESCRIPTION OF THE INVENTION

Figure 1:
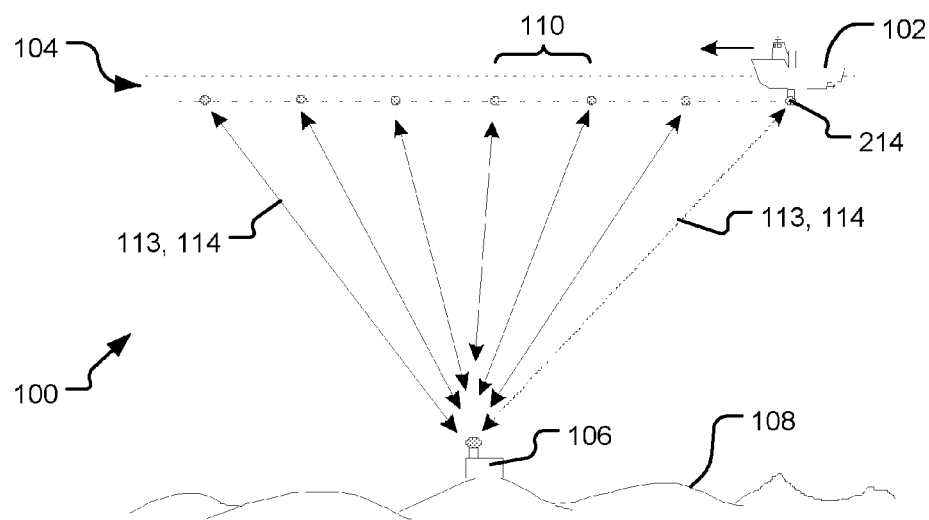
FIG. 1 is a schematic diagram of a data collection system constituting an embodiment of the invention.

Throughout the following description identical reference numerals will be used to identify like parts.

Figure 2:
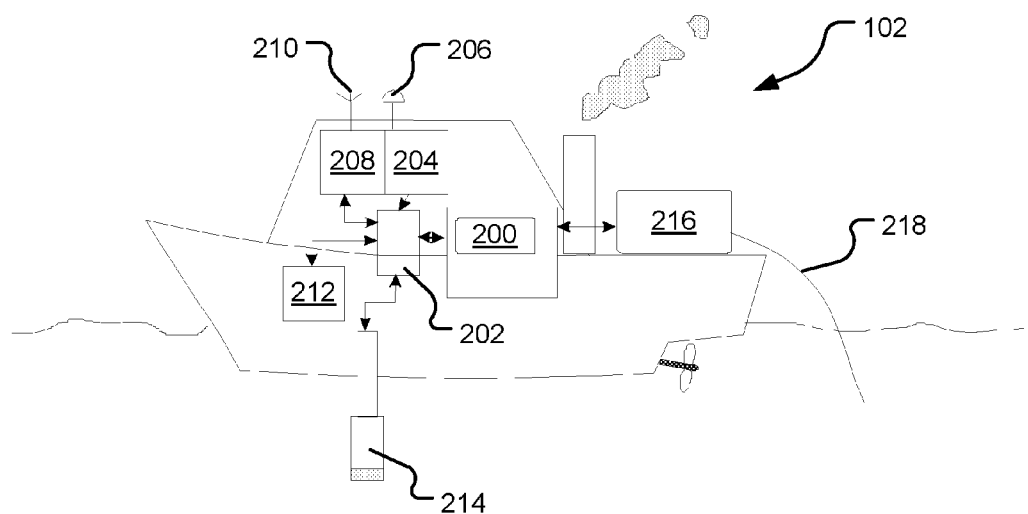
FIG. 2 is a schematic diagram of a seafaring vessel of FIG. 1.

Referring to FIG. 1, a data collection system 100 comprises a seafaring vessel 102, for example a ship or a boat, at a sea surface 104 and a subsea acoustic transponder beacon 106 located on a seabed 108 or any other fixed position relative to the seabed 108. The acoustic beacon 106 can be any suitable acoustic beacon, for example a suitably adapted Compatt 5 transponder available from Sonardyne International Limited, UK. Turning to FIG. 2, the vessel 102 comprises a processing resource 200 capable of processing and/or storing data. In this example, the processing resource 200 is "topside" and located in the vessel 102. However, the processing resource 200 can be distributed, for example part of the processing resource 200 can be located in the vessel 102 and another part of the processing resource 200 can be located elsewhere, for example at a land-based facility or another sea-based facility.

The processing resource 200 is operably coupled to a control module 202, the control module 202 being operably coupled to a Global Navigation Satellite System (GNSS) receiver, for example a Global Positioning System (GPS) receiver 204. The GPS receiver 204 is coupled to a GNSS antenna, for example a GPS antenna 206. The control module 202 is also operably coupled to a satellite communications receiver 208 coupled to a satellite communications antenna 210, for example, to receive GNSS augmentation data in order to increase accuracy of GNSS-based position calculations. The Ultra position system available from Veripos Limited, UK, is an example of a suitable system that supports the use of GNSS augmentation data. A position determination module 212 comprising, for example an Attitude and Heading Reference System (AHRS) and/or an Inertial Navigation System (INS), is also operably coupled to the control module 202. Additionally, an acoustic transceiver 214 is operably coupled to the control module 202. The acoustic transceiver 214 can be any suitable acoustic transceiver, for example a suitably adapted Fusion USBL transceiver available from Sonardyne International Limited, UK.

Figure 3:
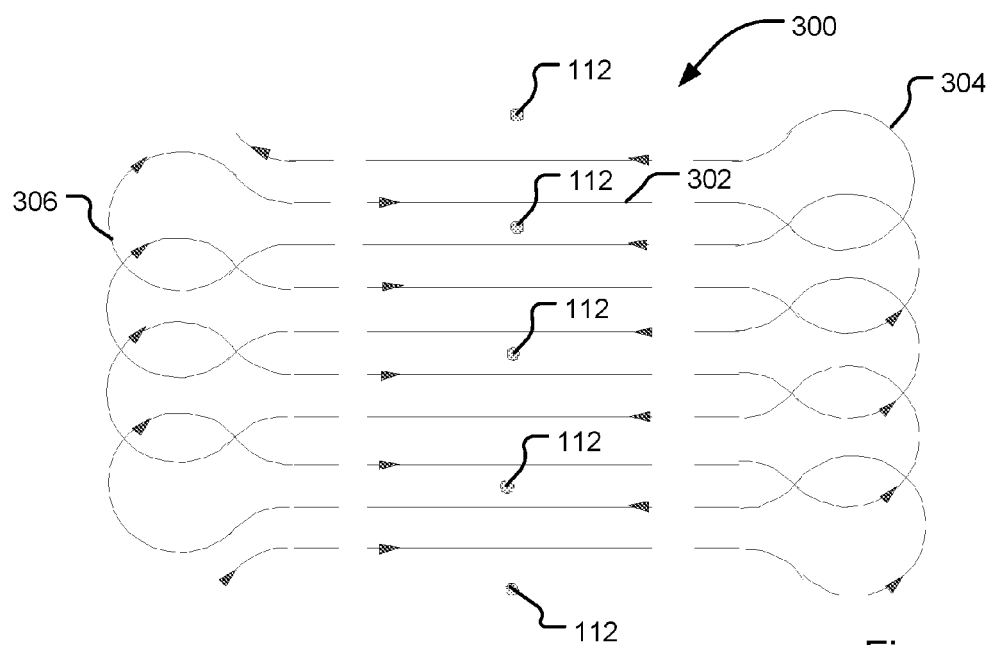
FIG. 3 is a schematic diagram of run lines traversed by the vessel of FIGS. 1 and 2 in accordance with a method of estimating a corrected sound speed that constitutes another embodiment of the invention.

Returning to FIG. 1, in operation, the vessel 102 traverses a path that is part of a plurality of run lines 300 (FIG. 3). During the traverse, the control module 202 controls the acoustic transceiver 214 in order to communicate with the acoustic beacon 106 by, for example, emitting an acoustic interrogation signal 113. The acoustic interrogation signal 113 is received by the acoustic beacon 106 and, in response thereto, the acoustic beacon 106 emits an acoustic response signal 114 that is received by the acoustic transceiver 214.

In respect of the transmission of the interrogation signal 113 and receipt of the response signal 114, the processing resource 200 acquires position data associated with the vessel 102 at the times of transmission and reception from the GPS receiver 204 and the position determination module 212, for example longitude and latitude coordinates, roll, pitch and heading data.

Figure 4:
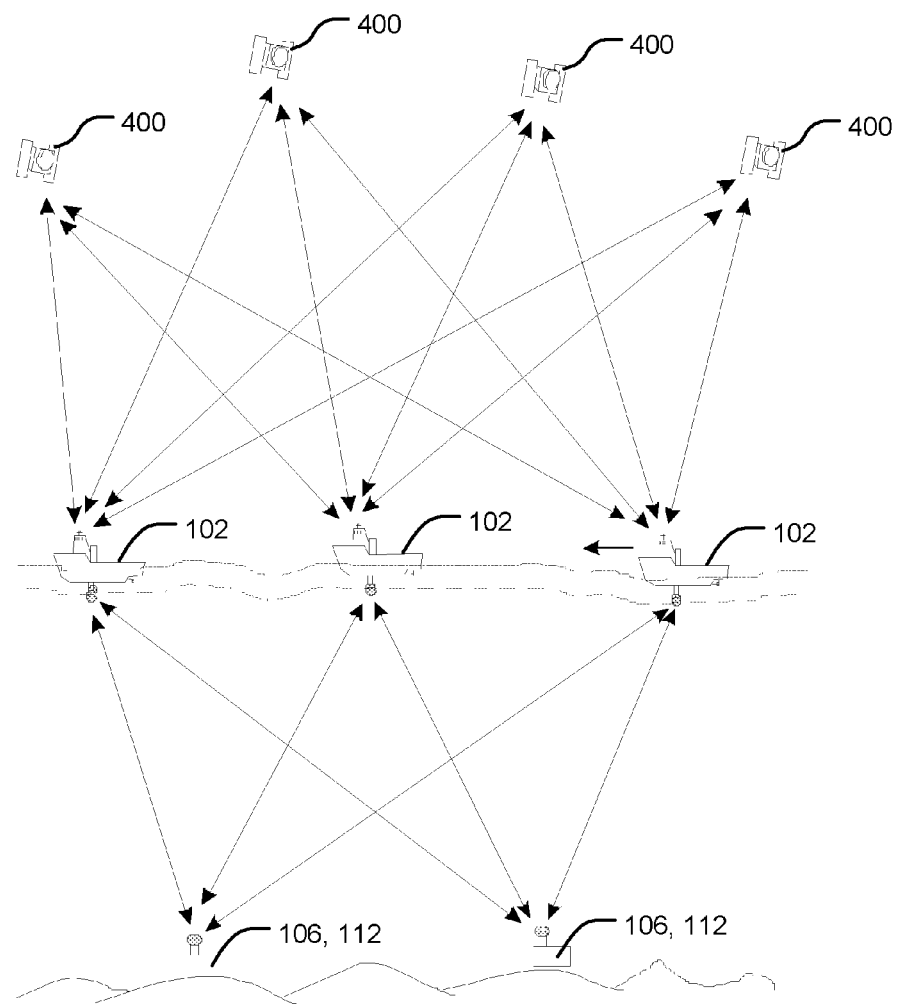
FIG. 4 is a schematic diagram of the seafaring vessel of FIG. 1 traversing the run lines of FIG. 3.

Referring to FIG. 4, the GPS receiver 204 can typically "see" at least three, in this example, four GPS satellites 400 from a constellation of GPS satellites orbiting the Earth, and using almanac and ephemeris data associated with the at least three satellites 400, the GPS receiver 204 is able to calculate the longitude and latitude coordinates of GPS antenna 206 and hence the vessel 102 using a known technique. However, in addition to the longitude and latitude coordinate data provided by the GPS receiver 204, the GPS receiver 204 is configured to provide RAW data, for example pseudo ranges data or one-way travel time data associated with communication of spread-spectrum signals from satellites seen by the GPS receiver 204 and associated clock offsets, phase data and, optionally, real-time ephemeris data. Using a so-called Precise Point Positioning algorithm, for example using precise orbit information from another source, more refined positions of the vessel 102 can be calculated by post-processing the additional data collected. The position of the vessel 102 can thus typically be determined to an accuracy of about 0.025 m in the horizontal and about 0.07 m in the vertical. In this example, the position estimate calculated is with respect to a reference spheroid model of the Earth and associated with Coordinated Universal Time (UTC). The UTC data is used to timestamp measurements.

The time of transmission of the interrogation signal 113 and the time of the receipt of the response signal 114 are stored by the processing resource 200 along with the position data associated with the vessel 102. The transmission of interrogation signal 113 and receipt of respective response signal 114 in reply thereto is repeated at predetermined intervals 110 and the position and time data associated therewith is stored by the processing resource 200 for further subsequent processing.

Referring back to FIG. 3, in this example, the run lines 300 are an array of reciprocating or snaking, substantially parallel, individual run lines, separated by turning circles 304, 306 at ends thereof. In this example, the run lines are between about 20 km and 200 km in length, for example 20 km in length, and are spaced between about 75 m and about 750 m apart, for example about 400 m apart. As can be seen from FIG. 3, a plurality of acoustic beacons 112 are deployed on the seabed 108, including the acoustic beacon 106 described above, substantially aligned using, for example a suitable GNSS positioning technique, and spaced about one water depth apart.

The data collected is post-processed and using, for example, a trilateration technique, the location of each of the acoustic beacons 112 is determined to an accuracy that is better than about 0.25 m. Additionally, using other known suitable techniques, including use of suitable traverses, careful selection of data and some knowledge of the speed of sound in the water column from the traverses, the position of the acoustic beacon 106 or beacons 112 can be estimated within the reference spheroid mentioned above to a high precision and with minimal bias error.

Figure 5:
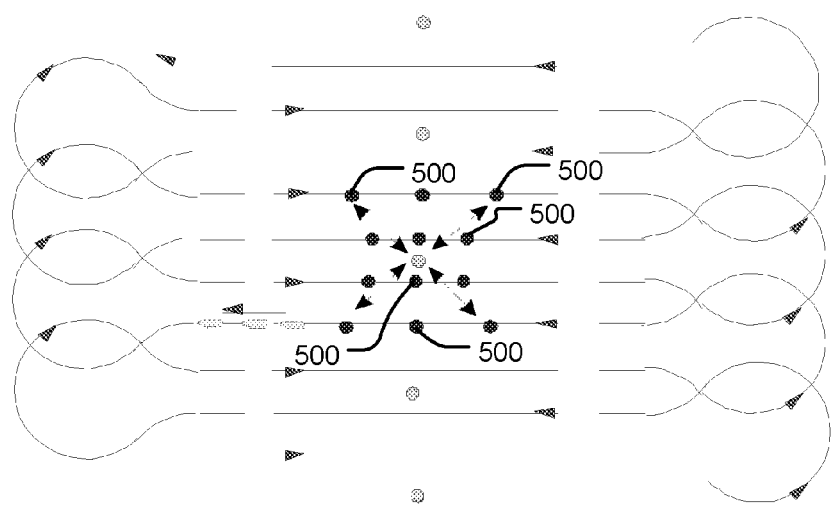
FIG. 5 is a schematic diagram of run lines traversed by the vessel of FIG. 1 and optimum data collection points that constitutes yet another embodiment of the invention.

In order to optimise the generation of the corrected sound speed model, thereby arriving at an unbiased estimate of the position of the acoustic beacon 106, 112, range data calculated should be selected such that an even distribution of data points 500 in all directions of the vessel 102 is selected (FIG. 5). Alternatively, the calculated range data is selected such that an even distribution of data exists normal to a direction of travel of the vessel 102 and in the direction of travel of the vessel 102.

Figure 6:
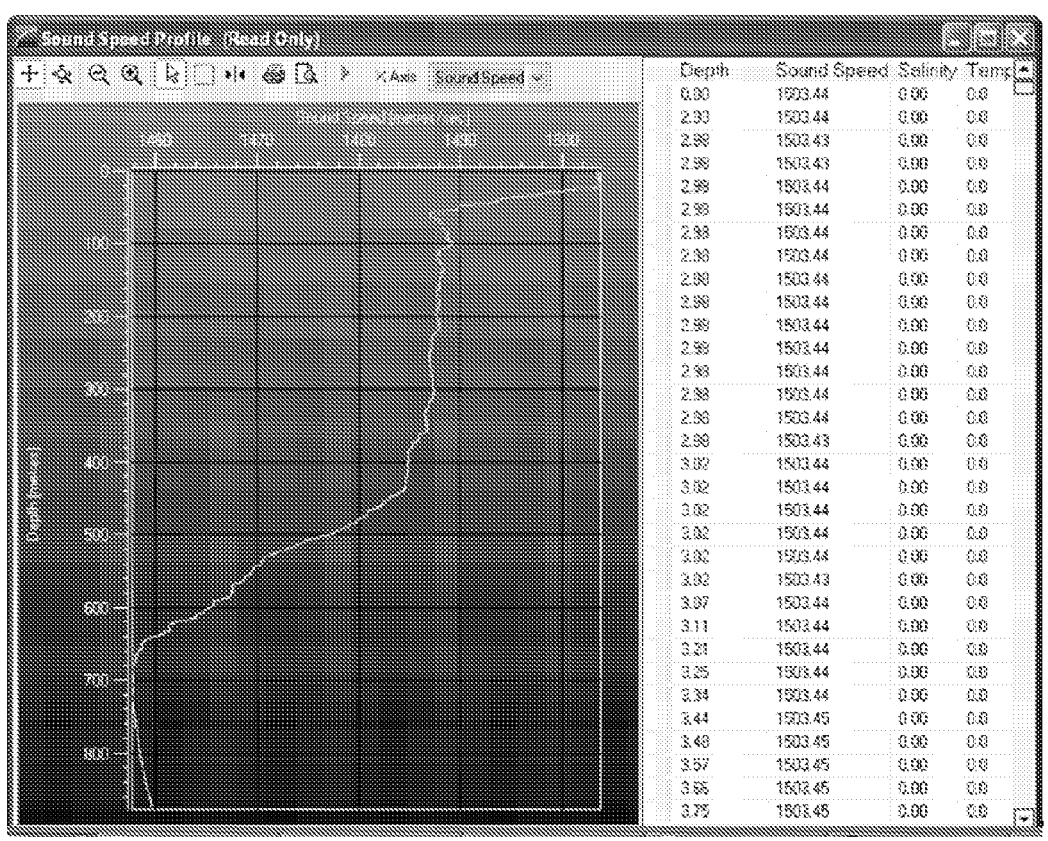
FIG. 6 is a screen shot from a ray trace software application used in the method of FIG. 3.
Figure 7:
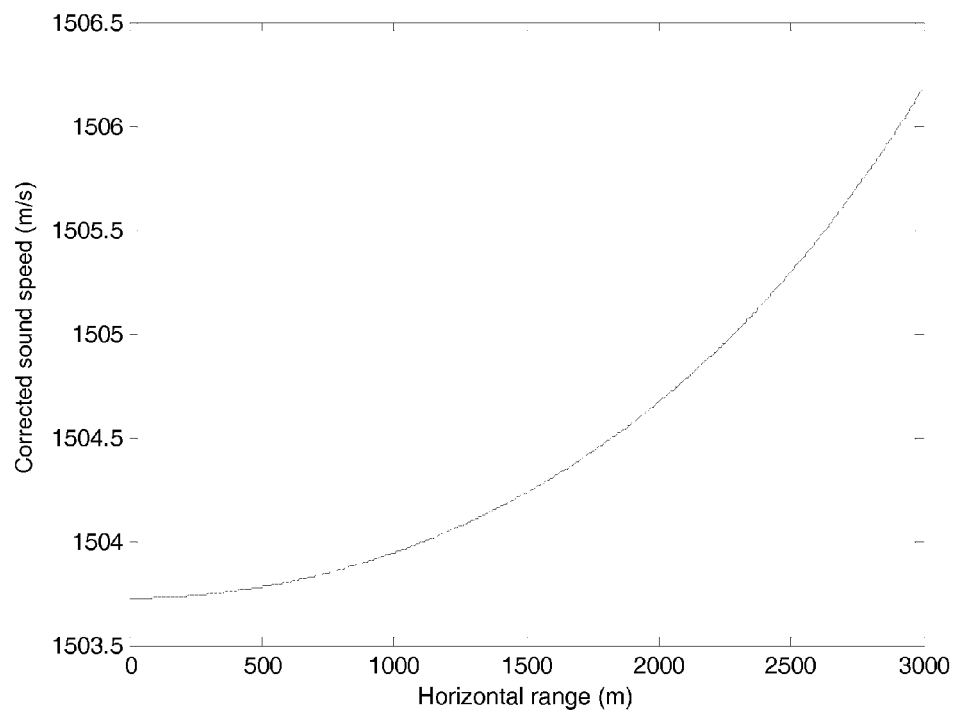
FIG. 7 is a screen shot from a corrected sound speed estimate model generated using the ray trace software application of FIG. 4.

With the knowledge of the location of the acoustic beacon 106 or the locations of the acoustic beacons 112, the processing resource 200 can employ a ray trace modelling software application (FIG. 6), constituting a ray tracing module, in order to model corrected sound speed in the water column, for example the Ray Trace package available from Sonardyne International Limited, UK. The ray trace modelling application is capable of estimating corrected sound speed for any path between a first point and a second point. Furthermore, the model generated is, in this example, of corrected sound speed as a function of horizontal position (FIG. 7), where a vertical separation of the acoustic beacon 106 and the acoustic transceiver 214 is constant. In this regard, it should be appreciated that this post-processing need not be performed aboard the vessel 102 and the processing resource 200 can be distributed, as mentioned above, the post-processing being performed at, for example, a land-based facility. As can be seen from FIG. 6, the corrected sound speed in the water column varies little when the path associated with the sound speed subtends up to about 45° from the vertical.

If data is selected to include only data for paths that subtend up to 45° from the vertical, the practical need to employ more complex processing is minimised, other than estimating an overall scale factor to apply to the sound speed to apply to the data. In this regard, the corrected sound speed model generated is used to linearise conversion of times-of-flight calculated to true distance, the remaining error being minimised by estimating the overall scale factor mentioned above as an additional parameter using a least squares adjustment method for estimating the position of the acoustic beacon(s) 106, 112.

If the above-described optimisation techniques do not result in a satisfactory beacon position estimate as indicated by error statistics derived from the least squares adjustment algorithm mentioned above, for example a variance matrix and/or covariance matrix and/or a residuals vector, the function of corrected sound speed versus horizontal distance can be modelled using a higher order function than a linear function, for example using a polynomial curve fitting method to fit a second order (quadratic) function, a third order (cubic) function, a fourth order polynomial function or a higher order polynomial function to the calculated corrected sound speeds.

As can be seen, the above data collection system employs two-way travel times in order to minimise errors attributable to sea water currents. In this respect, and to illustrate the difference between use of one-way travel times and two-way travel times, systems relying upon one-way travel times have significant error when a current as modest as 1 knot is present. In this respect, for two points separated by a distance, d, a sound speed, c, in the water column and a current, v, in a given direction, a travel time between the two points is given by the following expression:

$$\frac{d}{c+v} \tag{1}$$

whereas, for still water, where the current is obviously substantially equal to zero, the travel time between the two points is given by the following expression:

$$\frac{d}{c} \quad (2)$$

The error, in parts per million (ppm), attributable to the use of one-way travel times is given by the expression:

$$\left[\frac{c}{(c+v)} - 1\right] \cdot 10^6 \quad (3)$$

If $v=0.5$ ms$^{-1}$ and $c=1500$ ms$^{-1}$, the error, to two decimal places, is $-333.22$ ppm.

For two-way travel time measurement, the travel time between two points, is given by the following expression:

$$\frac{d}{c+v} + \frac{d}{c-v} \quad (4)$$

which, when $c \gg v$, simplifies to:

$$\frac{2d}{c} \quad (5)$$

The error, in parts per million (ppm), attributable to the use of two-way travel times is given by the expression:

$$\left[\frac{c^2}{(c^2 - v^2)} - 1\right] \cdot 10^6 \quad (6)$$

For the same current, v, and sound speed, c, the error is therefore 0.11 ppm, which given the typical scale of a marine seismic survey, is a significant reduction.

Figure 8:
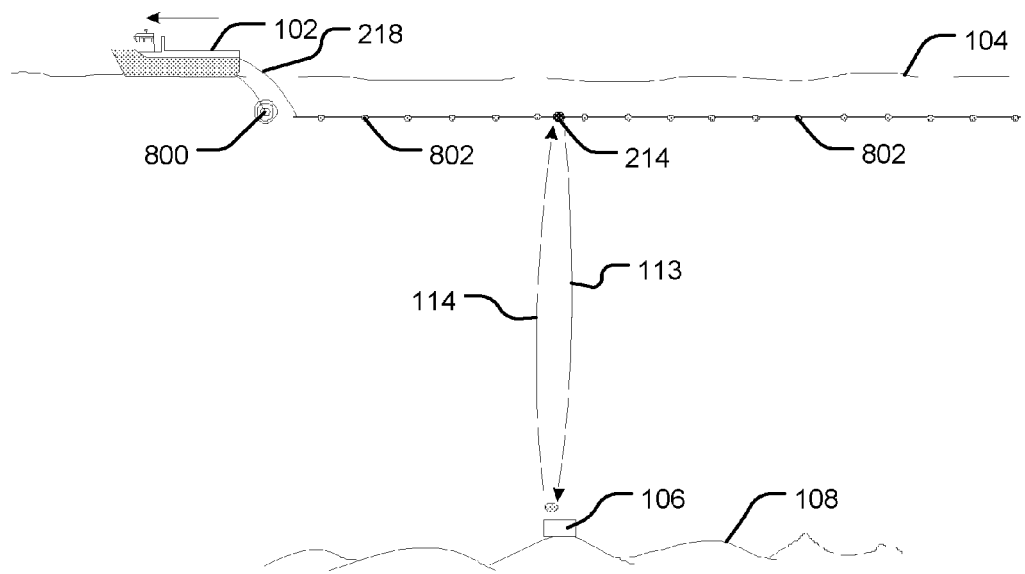
FIG. 8 is a schematic diagram of a marine seismic survey system constituting a further embodiment of the invention.

In another embodiment (FIG. 8), a marine seismic survey system comprises the vessel 102 and the acoustic beacon(s) 106, 112. However, in this embodiment, the acoustic transceiver 214 is disposed in a streamer 218 that is towed behind the vessel 102. In this respect, and referring back to FIG. 2, the streamer 218 is coupled to a cable transceiver system 216 located at a stern of the vessel 102, the cable transceiver system 216 being operably coupled to the processing resource 200 for data collection purposes. The skilled person should appreciate that although a single streamer is described and shown, the vessel 102 can typically tows a plurality of streamers, each of which can comprise a respective acoustic transceiver 214. Any suitable streamer system can be adapted for this embodiment.

In this example, the vessel 102 tows a sound source 800 and the streamer 218, the streamer 218 comprising a plurality of hydrophones 802 spaced along the streamer 218. The use of the sound source 800 and the hydrophones is ire accordance with any known suitable marine seismic surveying technique and so, in order not to distract from the important aspects of the embodiments herein, will not be described in further detail.

In operation, the vessel 102 follows a path according to a plurality of run lines 300 (FIG. 9), the run lines 300 being an array of substantially parallel individual run lines separated by turning circles 304, 206 at ends thereof. In this example, the run lines are between about 20 km and about 200 km in length, for example 20 km in length, and are spaced between about 75 m and about 750 m apart, for example about 400 m apart. As can be seen from FIG. 8, a plurality of acoustic beacons 112 are deployed on the seabed 108, including the acoustic beacon 106 described above, substantially aligned using, for example, a suitable GNSS positioning technique, and spaced about one water depth apart.

In this example, the acoustic transceiver 214 is disposed substantially about a mid-point of the streamer 218. The streamer 218 is typically 6 km in length and so the streamer 218 is sufficiently far behind the vessel for any aeration induced into the water column by the vessel 102 and the sound source 800 into the wake of the vessel 102 to have dissipated, allowing good acoustic propagation conditions for the interrogation and response signals 113, 114, as the vessel 102 traverses the run lines 300, for example at a speed of 2 ms$^{-1}$. In this regard, at the speed of 2 ms$^{-1}$, the acoustic transceiver 214, located at around the mid-point of the streamer 218, takes between about 15 minutes and about 60 minutes, for example about 20 minutes, to pass over the acoustic beacon 106 following the passage of the vessel 102 over the acoustic beacon 106.

Additionally, given that sound absorption by aeration in the wake of the vessel 102 by the sound source 800 is a function of frequency of the interrogation signal 113 and/or the response signal 114, locating the transceiver 214 in the streamer and hence at a location where the wake has dispersed minimises sound absorption experienced. In this respect, an appropriate frequency of the interrogation and/or response signal is used appropriate to a non-aerated location, for example between about 1 kHz and about 100 kHz, depending upon a number of parameters, including: separation between the acoustic beacon 106 and the transceiver 214, physical size constraints, for example the physical size of the transceiver 214 as compared with the size of the streamer 218, and/or transducer technology employed. In this example, the frequency employed is about 20 kHz, but from the above explanation the skilled person will appreciate that other suitable frequencies can be employed.

The data collection system described above in relation to previous embodiments operates in a like manner in respect of the present embodiment. However, the time-of-flight measurements are made substantially at the same time as a seismic survey is taking place and so the age of the estimated corrected sound speed model is reduced further as compared with previous embodiments.

Since the error in a model of the position and shape of the streamer 218 is greatest at the midpoint of the streamer, the position and shape of the streamer 218 is usually calculated using GNSS position data associated with the vessel 102 and GNSS position data associated with a buoy (not shown) towed from an aft end of the streamer 218, acoustic range measurements from a number of points along the streamer 218 to neighbouring streamers and magnetic heading measurement data from instrumentation in the streamer 218. Consequently, the provision of the acoustic transceiver 214 at the mid-point of the streamer 218 enables relative positions to be calculated, for example to the GNSS position of the vessel 102 and/or the GNSS position of the buoy mentioned above, and hence high quality information to be provided in respect of the mid-point of the streamer 218, where the position and shape model is at its least accurate.

Figure 9:
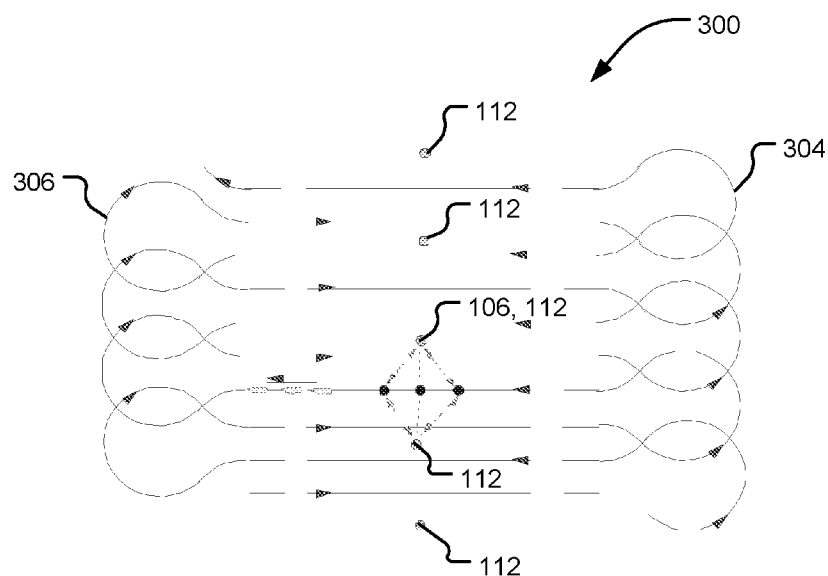
FIG. 9 is a schematic diagram of run lines traversed by the system of FIG. 8 another method of estimating a corrected sound speed that constitutes another embodiment of the invention.
Figure 10:
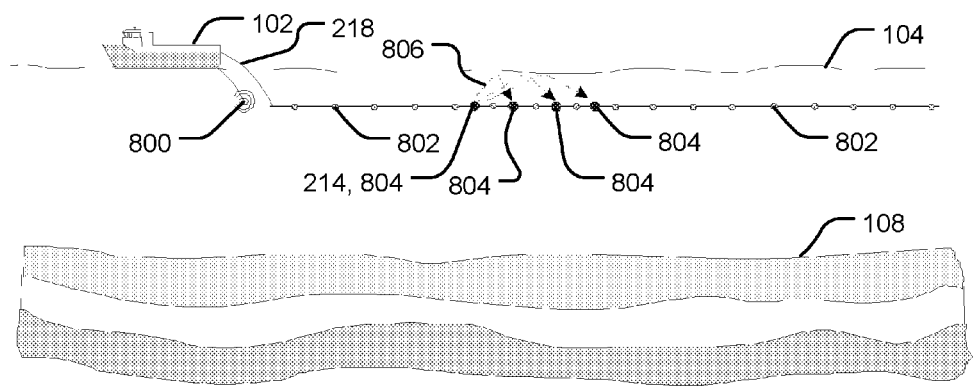
FIG. 10 is a schematic diagram of another marine seismic survey system constituting yet a further embodiment of the invention.

In a further embodiment (FIG. 10), the streamer of FIG. 9 comprises a plurality of acoustic transceivers 804 including the acoustic transceiver 214. The plurality of acoustic transceivers 804 are disposed about the mid-point of the streamer 218 and are spaced at predetermined intervals.

In operation, the plurality of transceivers 804 are used to measure times-of-flight 806 from the streamer 218 to the sea surface 104 and back to a number of points along the streamer 218. In this respect, a first acoustic transceiver 214 of the plurality of acoustic transceivers 804 transmits an acoustic test signal, which can be the interrogation signal 113, although another suitable acoustic signal can be employed, and the time of transmission of the signal along with the times of receipt by the remaining acoustic transceivers 804 in the streamer 218 are recorded and used, in this example, to augment the estimated corrected sound speed model in respect of upper layers, for example above the streamer 218, of the water column, using measured times-of-flight in respect of the upper layers and a range of angles of the vertical. It is also possible to measure speed of travel of the streamer 218 through the water. Indeed, a vector can be calculated in respect of speed through the water along the streamer 218 and transverse thereto (from streamer-to-streamer). In order to minimise loss of coherence of the reflected signals, the first acoustic transceiver 214 and the remaining acoustic transceivers 804 are relatively close to each other and the transmit-receive regime amongst the plurality of transceivers 804 can be arranged to operate in a structured manner in order to maximise system efficiency, for example a number of transceivers can be arranged to transmit in respect of a measurement event and one transceiver can be used to measure times of arrival of each signal at its position. Alternatively, one transceiver can be arranged to transmit at a time and one transceiver to receive multiple paths of the signal from the transmitting transceiver. Furthermore, the measurements can be repeated many times. Also, the signal used can be optimised for the measurements associated with modelling the upper layers, for example by using a wide bandwidth signal in order to maximise path resolution. The frequency can be between about 4 kHz and about 20 kHz.

In another example, in order to mitigate errors resulting from motion of the streamer 218 through the water, measurements are made in the direction of motion of the streamer 218, for example transmission from a transceiver that is further from the vessel 102 than a receiving transceiver, and the reverse of the direction of motion of the streamer 218, for example transmission from a transceiver that is closer to the vessel 102 than a receiving transceiver.

In such an example, the travel time, $t_1$, in the forward direction is given by the following expression:

$$t_1 = \frac{d + vt_1}{c} \quad (7)$$

where d is the distance of the path of the signal and v is the velocity of the vessel 102. By rearranging this expression (7), the velocity, v, is given as:

$$v = \frac{ct_1 - d}{t_1} \quad (8)$$

Similarly, in the reverse direction, the travel time, $t_2$, in the reverse direction is given by the following expression:

$$t_2 = \frac{d - vt_2}{c} \quad (9)$$

where d is the distance of the path of the signal and v is the velocity of the vessel 102. By rearranging this expression (9), the velocity, v, is given as:

$$v = \frac{d - ct_2}{t_2} \quad (10)$$

Hence, taking the expressions for the velocity, v, of the vessel 102, the following expression is obtained:

$$\frac{ct_1 - d}{t_1} = \frac{d - ct_2}{t_2} \quad (11)$$

which, after expansion and rearranging, yields:

$$2ct_1t_2 = d(t_1 + t_2) \quad (12)$$

and, rearranging again, yields:

$$c = \frac{d(t_1 + t_2)}{2t_1t_2} \quad (13)$$

Consequently, as the expressions for the respective travel times $t_1$, $t_2$ for each direction of measurement take account of the translation of the vessel 102, the error attributable to the translation of the vessel 102 is cancelled out by use of time-of-flight measurements in both directions, as evidenced by expression (13) above for the sound speed.

It should be appreciated that the embodiments described above are simply for exemplary purposes only and other implementations are intended in accordance with the scope of the appended claims.

Alternative embodiments of the invention can be implemented, at least in part, as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. A data collection system for estimating a corrected sound speed between a first point and a second point, the system comprising:
   a position determining apparatus arranged to generate, when in use, position data;
   a subsea acoustic transponder beacon disposed at a fixed position relative to a seabed;
   an acoustic transceiver immersed below a sea surface and above the acoustic beacon;
   a processing resource operably coupled to the acoustic transceiver; and
   the acoustic transceiver is arranged to traverse a path above the acoustic beacon and execute a plurality of communications with the acoustic beacon while traversing the path, the acoustic transceiver being arranged to execute the plurality of communications comprising:
the acoustic transceiver being arranged to transmit a plurality of acoustic interrogation signals to the acoustic beacon while traversing the path; and
the acoustic beacon being arranged to receive the respective interrogation signals and to transmit a respective plurality of acoustic response signals in response thereto; wherein
the processing resource is arranged to store a plurality of time data and position data associated with the plurality of communications between the acoustic transceiver and the acoustic beacon; and
the processing resource is arranged to use the plurality of time data and position data in order to model a profile of the corrected sound speed as a function of horizontal distance from a position of the acoustic beacon, the function being a higher order function than a linear function.

2. The system according to claim 1, wherein the communication between the acoustic transceiver and the acoustic beacon has a two-way travel time associated therewith.

3. The system according to claim 1, wherein the acoustic transceiver is arranged to transmit the interrogation signal to the acoustic beacon at predetermined intervals during the traversal of the path.

4. The system according to claim 1, wherein the processing resource is arranged to record a first time associated with transmittal of the interrogation signal and a second time associated with receipt of the response signal.

5. The system according to claim 1, wherein the processing resource is arranged to calculate a time-of-flight associated with the communication between the acoustic transceiver and the acoustic beacon.

6. The system according to claim 1, wherein the path traversed by the acoustic transceiver, when in use, is a plurality of substantially equal-spaced run lines arranged to form an array of run lines.

7. The system according to claim 1, further comprising a plurality of acoustic transponder beacons comprising the acoustic beacon; wherein the plurality of acoustic beacons is disposed at a plurality of respective fixed positions relative to the seabed.

8. The system according to claim 1, wherein the processing resource is arranged to estimate a position of the acoustic beacon using a trilateration technique.

9. The system according to claim 1, wherein the processing resource is arranged to use a ray tracing module in order to estimate the corrected sound speed.

10. The system according to claim 9, wherein the ray tracing module is arranged to calculate corrected sound speeds and to fit a function to the calculated corrected sound speeds, the function being of horizontal distance from a position of the acoustic beacon.

11. The system according to claim 1, further comprising:
a streamer, the streamer comprising the acoustic transceiver.

12. The system according to claim 11, wherein the streamer comprises a plurality of acoustic transceivers including the acoustic transceiver.

13. The system according to claim 12, wherein the processing resource is arranged to store time data and position data associated with a reflection of an acoustic signal by a sea surface above the streamer.

14. The system according to claim 13, wherein the time data and position data associated with the acoustic signal are in respect of a propagation path from the streamer, the propagation path comprising a reflection by the sea surface and arriving at a point along the streamer.

15. The system according to claim 14, wherein the reflection of the acoustic signal by the sea surface is to a plurality of points along the streamer, the reflected acoustic signal being received by a number of the plurality of acoustic transceivers.

16. The system according to claim 13, wherein the processing resource is arranged to calculate another time-of-flight associated with the acoustic signal reflected by the sea surface.

17. The system according to claim 13, wherein the plurality of acoustic transceivers comprises:
a first transceiver and a second transceiver, the first transceiver being arranged to transmit an acoustic signal for receipt by the second transceiver and the second transceiver being arranged to transmit another acoustic signal for receipt by the first transceiver, thereby enabling time-of-flight measurements to be made in respect of a forward direction of travel and a reverse direction of travel of the streamer.

18. The system according to claim 12, wherein the acoustic transceivers are spaced at predetermined intervals along the streamer.

19. The system according to claim 12, wherein the plurality of acoustic transceivers is disposed about a point substantially in the middle of the streamer.

20. The marine seismic survey system comprising:
a sound source; and
a data collection system according to claim 11.

21. A method of estimating a corrected sound speed between a first point and a second point, the method comprising:
disposing a subsea acoustic transponder beacon at a fixed position relative to a seabed;
immersing an acoustic transceiver below a sea surface and above the acoustic beacon;
the acoustic transceiver traversing a path above the acoustic beacon and executing a plurality of communications with the acoustic beacon while traversing the path, the execution of the plurality of communications comprising:
the acoustic transceiver transmitting a plurality of acoustic interrogation signals to the acoustic beacon while traversing the path; and
the acoustic beacon receiving the respective interrogation signals and transmitting a respective plurality of acoustic response signals in response thereto;
generating position data;
storing a plurality of time data and position data associated with the plurality of communications between the acoustic transceiver and the acoustic beacon; and
modeling a profile of the corrected sound speed as a function of horizontal distance from a position of the acoustic beacon using the plurality of time data and position data, the function being a higher order function than a linear function.

22. A data collection system for estimating a corrected sound speed between a first point and a second point, the system comprising:
a position determining apparatus arranged to generate, when in use, position data;

a subsea acoustic transponder beacon disposed at a fixed position relative to a seabed;

an acoustic transceiver immersed below a sea surface and above the acoustic beacon, the acoustic transceiver being arranged to traverse a path above the acoustic beacon and communicate with the acoustic beacon;

a processing resource operably coupled to the acoustic transceiver; wherein the processing resource is arranged to store time data and position data associated with the communication between the acoustic transceiver and the acoustic beacon;

the processing resource is arranged to use a ray tracing module in order to estimate the corrected sound speed; and the ray tracing module is arranged to calculate corrected sound speeds and to fit a function to the calculated corrected sound speeds, the function being of horizontal distance from a position of the acoustic beacon.

* * * * *